United States Patent [19]

Herzog

[11] 4,199,663

[45] Apr. 22, 1980

[54] AUTONOMOUS TERMINAL DATA COMMUNICATIONS SYSTEM

[75] Inventor: Hans K. Herzog, Bellevue, Wash.

[73] Assignee: The Boeing Company, Seattle, Wash.

[21] Appl. No.: 957,743

[22] Filed: Nov. 6, 1978

[51] Int. Cl.² .............................................. H04J 6/02
[52] U.S. Cl. ...................................... 370/85; 370/92; 370/101; 370/108
[58] Field of Search ........ 179/15 AL, 15 BY, 15 BA, 179/15 BV

[56] References Cited

U.S. PATENT DOCUMENTS

| 3,601,543 | 8/1971 | Maniere | 179/15 AL |
| 3,680,056 | 7/1972 | Kropfl | 179/15 AL |
| 4,053,714 | 10/1977 | Long | 179/15 AL |
| 4,156,112 | 5/1979 | Moreland | 179/15 AL |

*Primary Examiner*—David L. Stewart
*Attorney, Agent, or Firm*—Christensen, O'Connor, Johnson & Kindness

[57] ABSTRACT

A data communication system which includes a plurality of terminals and a data bus, wherein each of the terminals has autonomous access to the data bus. Normally, all terminals are enabled to receive messages on the data bus. To prevent the simultaneous transmission of messages by two or more terminals, each terminal continuously monitors the data bus and is enabled to transmit a message only when the data bus has been silent, e.g., there is an absence of messages on the data bus, for a predetermined period of time which is unique to the terminal, and when a periodic transmission interval for the terminal has been reinitiated. The periodic transmission interval is substantially the same for all terminals, and is measured at each terminal from the time of a previous message transmission thereby. Each terminal includes provision for transferring data in the messages received thereby to an associated utilization device, provided that the data is identified with a proper label, and for converting data transferred from the utilization device into an appropriate message for transmission on the data bus. Preferably, the data bus comprises a twisted pair of wires having short-circuit terminations, with each terminal being inductively coupled thereto, and with the messages being in the form of serial, digital words.

22 Claims, 15 Drawing Figures

AUTONOMOUS TERMINAL DATA COMMUNICATIONS SYSTEM

FIELD OF THE INVENTION

This invention generally relates to the field of data communications, and, more particularly, to a system providing data communication among a plurality of terminals over a common data communication medium, with each terminal having autonomous access to the data communication medium independent of any other terminal or device.

BACKGROUND OF THE INVENTION

In modern aircraft, it is desirable to integrate, as far as possible, the functions of previously-independent avionic systems to permit an attendant reduction in weight, space and power requirements of the avionic systems and a simplification in wiring between physically separated avionic systems or subsystems thereof. Such integration has been achieved by the use of a common data communication medium, or data bus, to which each avionic system, or subsystem thereof, has access through an associated terminal, each of which is capable of transmitting and receiving data on the data bus. Data transmitted on the data bus by one terminal associated with a particular system or subsystem can be received by the terminals associated with the remaining systems or subsystems, thus eliminating the requirement for separate wiring interconnections between the systems or subsystems. In addition, data generated in a particular system or subsystem can be used by any other system or subsystem without the necessity of having to independently generate that data.

In order for a data communication system using a data bus to properly and reliably operate, without degradation upon the performance of any of the systems or subsystems coupled thereto, it is desirable that the data communication system allow tranmission of data originating from any terminal to any or all of the remaining terminals using a minimum physical length of the data bus. Also, the data communication system must be capable of accommodating periodic tranmission of any or all data. For example, if a particular terminal is inhibited from transmitting in a periodic manner, then those terminals that depend upon such data may malfunction. Further, operation of any one of the systems, subsystems or terminals associated therewith, must not be affected by the operational status of any other system, subsystem or terminal, whether such other system, subsystem or terminal be operating normally or be malfunctioning. Finally, the data bus, and any devices for coupling the data bus to each terminal which conceivably could render the data bus unusable, must be of such high functional integrity so as to make the possibility of data bus failure extremely remote.

The data communication systems using a data bus that have been particularly proposed for use in aircraft have taken two forms. The first, known as a broadcast bus, includes a single data bus which is exclusively assigned to one data source terminal. Data transmitted on the data bus from the data source terminal can be received by any number of receiver terminals coupled to the data bus. Although the broadcast bus is capable of accommodating periodic data transmissions, it is not capable of bilateral data communications. Accordingly, a separate data bus must be used for each data source terminal. Also, any device requiring the use of data from more than one data source terminal must be separately coupled with each required data bus. Accordingly, the broadcast bus does not permit a significant reduction to be made in aircraft wiring interconnections.

The second, known as a multiplex bus using a central bus controller, includes a single data bus having coupled thereto a plurality of remote terminals and a central bus controller terminal. The bus controller terminal determines (under software control) the mode of operation of any remote terminal, and controls such mode of operation by the transmission of command words on the bus. The multiplex bus, although capable of significantly reducing aircraft wiring interconnections, is not inherently suitable for periodic data transmission by each remote terminal. More important, the operation of remote terminals is not autonomous due to their dependence on the bus controller terminal, so that failure of the bus controller terminal constitutes failure of all remote terminals associated with the data bus.

It is therefore an object of this invention to provide an improved data communication system using a data bus.

It is a further object of this invention to provide such a data communication system which permits each participating terminal to have autonomous access to the data bus.

It is yet a further object of this invention to provide such a data communication system in which normal operation of any participating terminal, or malfunction thereof, will not affect the operation of the data communication system or of any other participating terminal associated therewith.

It is another object of this invention to provide such a data communication system which permits each participating terminal to engage in periodic data tranmissions on the data bus.

It is yet another object of this invention to provide such a data communication system which affords multiplexed data communications among participating terminals without the requirement for a central bus controller terminal.

It is still another object of this invention to provide such a data communication system which permits a significant reduction in the wiring requirements between participating systems and a significant increase in the integration of such systems.

SUMMARY OF THE INVENTION

The foregoing objects, and other objects and advantages that will be apparent to those of ordinary skill in the art, are achieved by the use of a method which permits a plurality of terminals to autonomously and periodically transmit messages on a data communication medium. At each terminal, the absence of messages on the data communication medium is detected. Transmission of a message by each terminal is enabled, however, only upon the occurrence of an absence of messages on the data communication medium whose duration substantially equals that of an inter-message gap unique to that terminal, and, the elapse of a transmission interval from a previous transmission of a message by that terminal. The duration of the transmission intervals of all terminals is substantially the same and is preferably chosen to be greater than the sum of all terminal inter-message gaps and of the durations of all messages transmitted by the terminals since a previous transmission of a message by each terminal.

BRIEF DESCRIPTION OF THE DRAWINGS

The invention can best be understood by reference to the following portion of the specification, taken in conjunction with the accompanying drawings, in which:

FIGS. 10 and 11 are signal diagrams illustrating the operation of the sync pattern detection circuit in FIG. 9.

DESCRIPTION OF A PREFERRED EMBODIMENT

Figure 1:
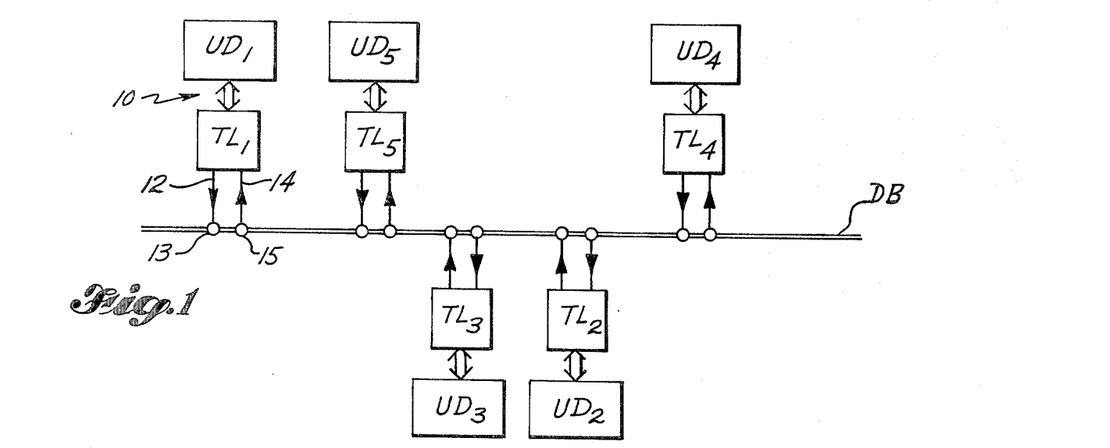
FIG. 1 is a block diagram of the data communication system using a data bus and having a plurality of participating terminals coupled thereto.

With reference now to FIG. 1, the data communication system illustrated therein is adapted to provide data communications among a plurality of utilization devices $UD_1$-$UD_5$. In practical applications, the utilization devices $UD_1$-$UD_5$ may comprise a plurality of avionic systems, or subsystems, or, a plurality of computer-related devices such as a central processing unit (CPU), input/output (I/O) devices, displays, memories, or the like. Each of the utilization devices $UD_1$-$UD_5$ may include means for transmitting data, means for receiving data, or both. In FIG. 1, utilization devices $UD_1$-$UD_4$ are capable of transmitting and receiving data, whereas utilization device $UD_5$ is capable only of receiving data. The data communication system of the present invention includes a plurality of terminals $TL_1$-$TL_5$ which are associated with respective ones of the utilization devices $UD_1$-$UD_5$, and also includes a common data communication medium to which the plurality of terminals $TL_1$-$TL_5$ are coupled. In the embodiment shown in FIG. 1 and discussed hereinafter, the data communication medium comprises a data bus DB, which may take many forms, such as one or more electrical conductors, a magnetic member, a waveguide, or a fiber-optic member. Preferably, the data bus DB includes a single twisted pair of wires extending to the physical locations of the utilization devices $UD_1$-$UD_5$. The present invention does not require, however, that the data communication medium be limited to a physical apparatus such as data bus DB, so that the data communication medium may comprise any appropriate carrier, such as audio, radio or light frequency waves or pulses, which is capable of carrying information by way of modulation thereof.

In FIG. 1, each terminal includes a data communications link 10 for exchanging data with its associated utilization device, an output 12 upon which transmitted data appears and which is coupled to the data bus DB by a bus coupler 13, and an input 14 for receiving data present on the data bus DB, with the input 14 being coupled to the data bus DB by a bus coupler 15. In the embodiment shown in FIG. 1 and discussed hereinafter, the data to be transmitted and received using the data bus DB is in the form of messages comprising one or more, succesive serial digital words.

Figure 2:
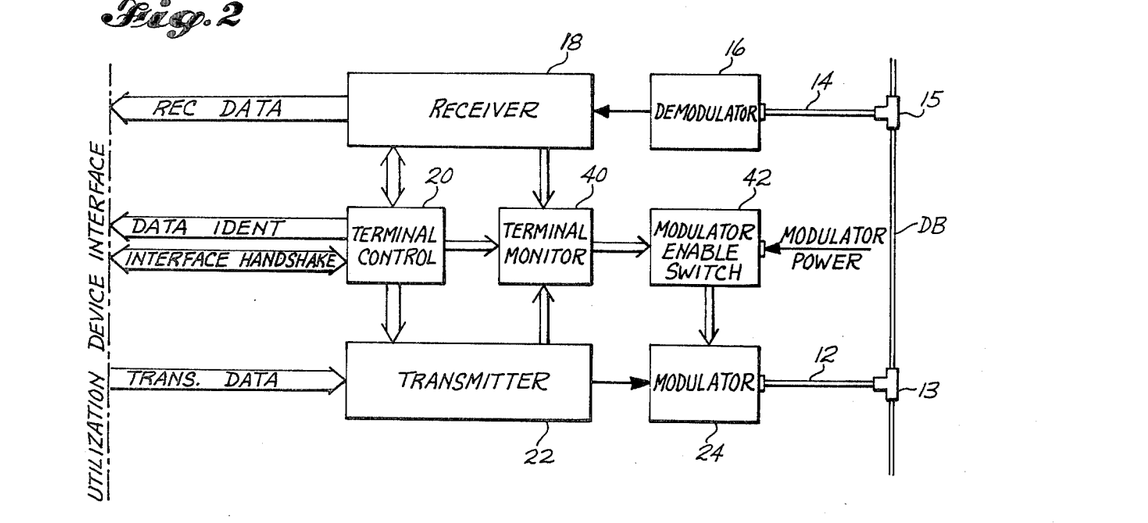
FIG. 2 is a block diagram of a typical participating terminal.

Referring now to FIG. 2, each terminal includes a demodulator 16 for demodulating the messages on the data bus DB received via coupler 15 and input 14 and for supplying the demodulated messages to a receiver 18. The demodulated messages are temporarily stored within the receiver 18, and the data therein is sent in an appropriate format to the associated utilization device under control of a terminal control unit 20 which exchanges "interface handshake" information with the utilization device and which provides the utilization device with an identification of the data that has been received. A transmitter 22 receives data from its associated utilization device, again under control of the terminal control unit 20 and outputs such data in the form of messages comprising one or more successive, several digital words at periodic transmission intervals determined by the terminal control unit 20. A modulator 24 modulates the messages in a desired manner and supplies the modulated messages to the data bus DB via the output 12 and bus coupler 13.

Normally, the receiver 18 in each terminal is enabled and the transmitter 22 is disabled. The terminal control units 20 in the plurality of terminals $TL_1$-$TL_4$ utilize an identical and unique terminal control routine, or protocol, which insures that only one terminal is transmitting at a given time and that, under steady-state conditions, transmission by any terminal occurs at periodic transmission intervals.

In detail, the protocol requires that: (a) the transmission interval for each terminal be the nominal time interval between the initiation of periodic data transmissions by the terminal, and that the transmission intervals for all terminals be approximately the same in duration; (b) each transmitting terminal be capable of transmitting one message, including one or more data words, with appropriate labels, check words and parity words during each transmission interval; (c) each message can have any desired duration so long as such duration is fixed during times when periodic transmission by the terminal is required and so long as the sum of the durations of the messages of all terminals, and all inter-message gaps, plus a growth gap to be described hereinafter, does not exceed the duration of each transmission interval; (d) each transmitting terminal initiates data transmission only upon the concurrence of the expiration of an inter-message gap on the data bus which is unique to that transmitting terminal, and, the elapse of a period of time, from a previous transmission by the terminal, which is substantially equal to the transmission interval; and, (e) any inter-word gaps in any message have a duration which is less than that of the shortest intermessage gap.

Figure 4:
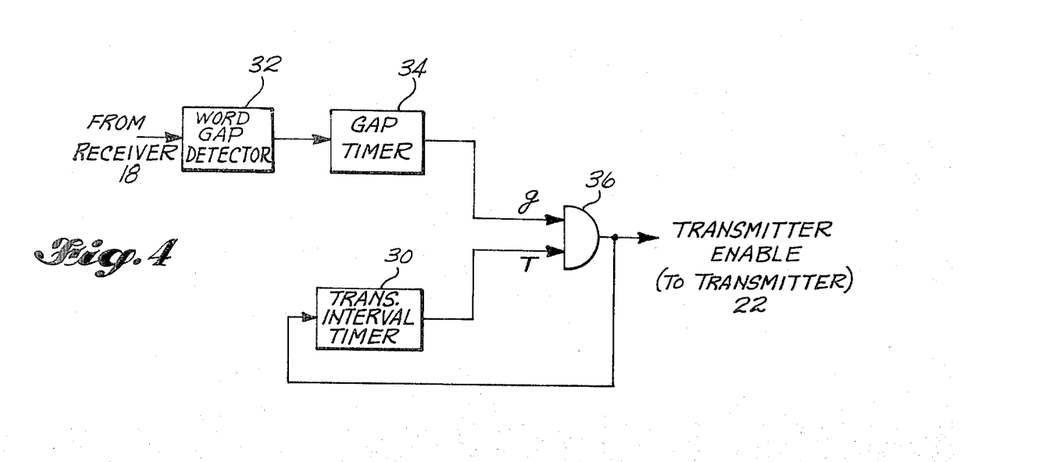
FIG. 4 is a block diagram of a portion of a terminal control unit in FIG. 2.

Requirements (a) and (d) of the protocol must be met in every application of the invention and can be embodied in each terminal control unit 20 by the use of circuitry such as illustrated in FIG. 4. A transmission interval timer 30 is reset at the time of a previous message transmission by the terminal, as explained hereinafter, and provides an output signal at elapse of a predetermined period of time thereafter, the predetermined period being substantially equal to the transmission interval. A word gap detector 32 receives the demodulated messages from the receiver 18 and provides an output signal only when such demodulated messages are absent, signifying an inter-word or inter-message gap on the data bus DB. A gap timer 34 is adapted to time the duration of each output signal from word gap detector 32 and to provide an output signal only when the duration of the output signal from word gap detector 32 exceeds the unique inter-message gap assigned to the terminal. An AND gate 36 provides a transmitter enable signal to the transmitter 22 only upon concurrence of the output signals from transmission interval timer 30 and gap timer 34, so that transmitter 22 is enabled to transmit a message on the data bus DB. The resultant transmission of a message causes word gap detector 32 to terminate its output signal, thereby resetting gap timer 34, and the transmitter enable signal is used to reset transmission interval timer 30, so that the terminal control unit 20 is again enabled to detect the conditions that will permit a subsequent message transmission by the terminal.

Figure 3:
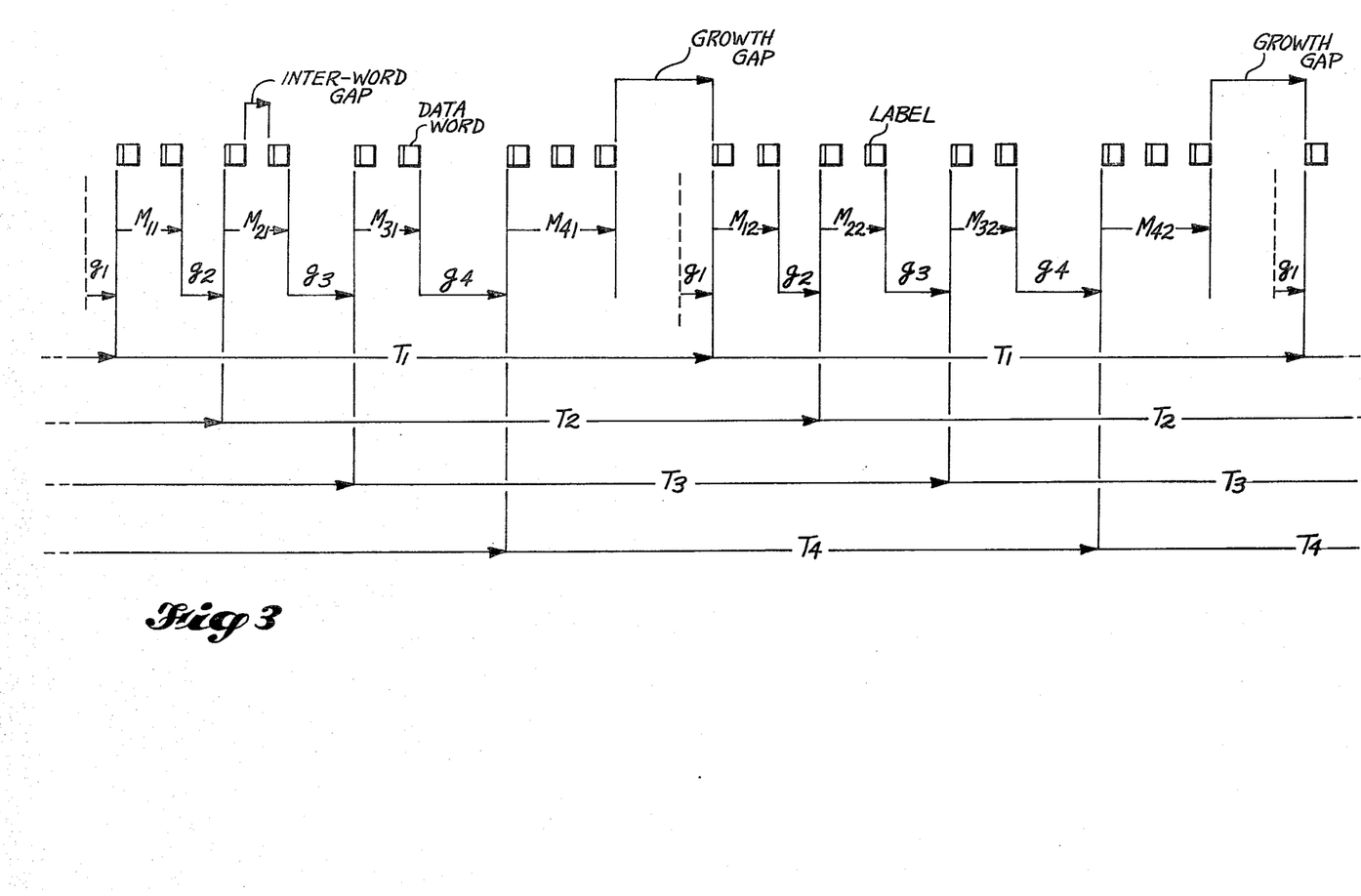
FIG. 3 is a timing diagram illustrating the operation of the data communication system under ideal, steady-state conditions.

To more fully understand the operation of the data communication system, reference should be made to FIG. 3 which comprises a timing chart illustrating a plurality of successive cycles of operation of the data communication system under ideal, steady-state conditions.

Terminals $TL_1$-$TL_4$ are capable of transmitting messages, with the message being transmitted by each of the terminals $TL_1$-$TL_3$ including two successive data words, each data word being of a predetermined length and being preceded by a label identifying the data therein, and with the data words in each message being separated by an inter-word gap. As illustrated, the messages $M_{11}$, $M_{21}$ and $M_{31}$ transmitted by the terminals $TL_1$-$TL_3$ during the first illustrated cycle of operation of the data communiction system are of equal duration. The message $M_{41}$ of terminal $TL_4$ includes three data words, each data word being of a predetermined length and being preceded by a label identifying the data therein, the data words again being separated by an inter-word gap and with message $M_{41}$ therefore being longer in duration than messages $M_{11}$, $M_{21}$ and $M_{31}$. During the second cycle of operation of the data communication system illustrated in FIG. 3, terminals $TL_1$-$TL_3$ transmit messages $M_{12}$, $M_{22}$ and $M_{32}$, each of identical duration to corresponding messages $M_{11}$, $M_{21}$ and $M_{31}$, and terminal $TL_4$ transmits message $M_{42}$ of identical duration to message $M_{41}$.

The terminal control unit 20 in each of the terminals $TL_1$-$TL_4$ establishes (through its gap timer 34) a unique inter-message gap for the associated terminal (that is, gaps $g_1$, $g_2$, $g_3$ and $g_4$ for terminals $TL_1$, $TL_2$, $TL_3$ and $TL_4$, respectively, with $g_1 < g_2 < g_3 < g_4$). The terminal control unit 20 in each of the terminals $TL_1$-$TL_4$ also establishes a transmission interval through its transmission interval timer 30 (that is, transmission intervals $T_1$, $T_2$, $T_3$ and $T_4$ for terminals $TL_1$, $TL_2$, $TL_3$ and $TL_4$, respectively, with $T_1 \simeq T_2 \simeq T_3 \simeq T_4$). As previously indicated, the transmitter 22 in each of the terminals $TL_1$-$TL_4$ is not enabled until concurrence of expiration of the unique inter-message gap associated with the terminal and elapse of the transmission interval for that terminal.

With reference again to FIG. 3, let it be assumed that transmitter 22 in terminal $TL_1$ is transmitting message $M_{11}$, during its associated transmission interval $T_1$, and that the transmission intervals $T_2$-$T_4$ have not yet elapsed. At the termination of message $M_{11}$, the absence of message on the data bus DB causes the gap timers 34 in each of the terminals $TL_1$-$TL_4$ to begin timing. After the expiration of a time equal to gap $g_1$, the gap timer 34 in terminal $TL_1$ provides an output signal. However, since the transmission interval $T_1$ for terminal $TL_1$ has not yet again elapsed, no transmitter enable signal is provided by AND gate 36 in terminal $TL_1$, and accordingly transmitter 22 therein is not enabled. Subsequently, the gap timer 34 in terminal $TL_2$ provides an output signal upon expiration of the gap $g_2$ associated therewith. Under the steady-state operation illustrated in FIG. 3, the transmission interval $T_2$ for terminal $TL_2$ will also have elapsed, so that a transmitter enable signal is provided by the AND gate 36 in terminal $TL_2$ to enable the transmitter 22 therein, whereby the message $M_{21}$ is transmitted.

After the transmission of the first data word in message $M_{21}$, the gap timers 34 in the terminals $TL_1$ and $TL_3$-$TL_4$ are again enabled. However, since the inter-word gap is shorter than any of the inter-message gaps (the shortest of which is gap $g_1$), the initiation of transmission of the second data word in message $M_{21}$ occurs before any of the gap timers 34 provides an output signal, theeby inhibiting the terminals $TL_1$, $TL_3$ and $TL_4$ from transmission during message $M_{21}$. At the termination of message $M_{21}$, the gap timers 34 in each of the terminals $TL_1$-$TL_4$ are again enabled. Upon successive expiration of the gaps $g_1$ and $g_2$, the gap timers 34 in terminals $TL_1$ and $TL_2$ again provide an output signal. However, the transmitters 22 in terminals $TL_1$ and $TL_2$ are not enabled inasmuch as their respective transmission intervals $T_1$, $T_2$ have not again elapsed. Upon subsequent expiration of the gap $g_3$, the gap timer 34 in terminal $TL_3$ provdes an output signal. Since the transmission interval $T_3$ associated with terminal $TL_3$ has also elapsed, a transmitter enable signal is provided by AND gate 36 in terminal $TL_1$ to enable transmitter 22 therein so that message $M_{31}$ is transmitted. Similarly, upon termination of message $M_{31}$, and after expiration of gap $g_4$, transmitter 22 in terminal $TL_4$ is enabled to transmit message $M_{41}$.

After the termination of message $M_{41}$, the gap timers 34 in each of the terminals $TL_1$-$TL_4$ are again enabled. As previously noted, the length of each transmission interval $T_1$-$T_4$ is chosen to be somewhat longer than the duration of all messages during each cycle of operation of the data communication system (e.g., $M_{11}+M_{21}+M_{31}+M_{41}$) and the sum of all inter-message gaps (e.g., $g_1+g_2+g_3+g_4$). Accordingly, at least the gap timer 34 associated with the terminal having the shortest inter-message gap (e.g., gap $g_1$ associated with terminal $TL_1$) provides an output signal before the first-in-time transmission interval (e.g., interval $T_1$) again elapses. Upon the subsequent elapse of transmission interval $T_1$, the transmitter 22 in terminal $TL_1$ is next enabled to transmit the message $M_{12}$, whereupon a second cycle of the data communication system is initiated. Operation of the data communication system then proceeds in a manner identical to that previously described for the first cycle of operation thereof, with the successive transmission of messages $M_{22}$, $M_{32}$ and $M_{42}$ upon expiration of the gaps $g_2$, $g_3$ and $g_4$ and the elapse of the transmission intervals $T_2$, $T_3$ and $T_4$ respectively associated with terminals $TL_2$, $TL_3$ and $TL_4$.

Since the receivers 18 in each of the terminals $TL_1$–$TL_5$ associated with the data bus DB are continuously enabled it can be seen that the data words on the data bus DB can be detected by any of the participating terminals and transferred, upon proper identification, to their associated utilization device.

In order that only one terminal be in a transmitting mode at any one time, it is essential that the protocol previously discussed be strictly adhered to. Although it is not necessary that the transmission interval timers 30 be synchronized with each other, it is necessary that all transmission intervals be approximately equal in duration so that a successive transmission interval (e.g., $T_2$) does not elapse at or before the elapse of a previous transmission interval (e.g., $T_1$). Likewise, although it is not necessary that the gap timers 34 be synchronized, it is necessary that they have a stable time base so that the gap of any terminal does not approximate the gap of any other terminal. Finally, the time base establishing the inter-word gap in each of the terminal control units 20 must be stable so that the inter-word gap of any terminal does not equal or exceed the inter-message gap of any terminal.

In order to insure that the protocol is strictly adhered to, each terminal includes a terminal monitor 40 (FIG. 2) which receives signals from the receiver 18, the terminal control unit 20, and the transmitter 22 therein. Each terminal monitor 40 includes an independent time base which establishes the desired inter-word gap, inter-message gap, and transmission interval for its associated terminal. The terminal monitor 40 also includes circuitry for comparing the actual inter-word gap, inter-message gap, and transmission interval provided by its associated terminal with the desired inter-word gap, inter-message gap, and transmission interval established by the independent time base therein. If any of these comparisons fail to be made, the terminal monitor 40 supplies a signal to a modulator enable switch 42 which responsively removes power from the modulator 24 to inhibit further transmissions by the associated terminal.

The cycles of operation illustrated in FIG. 3 represent an ideal, steady-state situation which will not likely be encountered in actual practice. To give an example, let it be assumed that the data communication system has been inoperative and that power is subsequently applied to terminals $TL_1$–$TL_5$. Since the power supplies in the terminals $TL_1$–$T_5$ will not all come up to operating specifications at the same time, it can be seen that one of the terminals $TL_1$–$TL_5$ will be capable of transmission before the other terminals. Let is be assumed that terminal $TL_4$ is first capable of transmission, and accordingly initiates transmission of a message therefrom on the data bus DB and initiates its associated transmission interval $T_4$. After termination of the message from terminal $TL_4$, let it be assumed that only terminal $TL_2$ is then capable of transmission. Accordingly, after termination of the inter-message gap $g_2$, terminal $TL_2$ initiates transmission of a message on the data bus DB and initiates its transmission interval $T_2$. Subsequently, let it be assumed that terminals $TL_1$ and $TL_3$ successively engage in transmissions upon the data bus DB, and initiate their respective transmission intervals $T_1$, $T_3$. As a result, it can be seen that a cycle of operation of the data communication system will consist of successive transmissions from terminals $TL_4$, $TL_2$, $TL_1$ and $TL_3$, with simultaneous transmission by two or more terminals being inhibited by the protocol which requires concurrence of the expiration of the unique inter-message gap and the elapse of the transmission interval associated with each terminal.

It should also be noted that the "growth gap", or the time between the termination of the last message in the cycle of operation of the data communication system and the initiation of a successive cycle of operation thereof, always precedes the transmission interval of the terminal having the slowest time base, that is, the terminal whose transmission interval timer 30 has the longest actual period. To understand this point, reference should again be made to FIG. 3. Let it be assumed that the transmission interval timer 30 in terminal $TL_4$ has the longest actual period. Accordingly, the time at which a message transmitted by terminal $TL_4$ occurs, relative to the time ocurrence of the termination of the message transmissions from the remaining terminals $TL_1$–$TL_3$, is successively delayed in successive cycles of operation of the data communication system, with the result that the growth gap illustrated in FIG. 3 becomes sucessively shorter, until the growth gap is reduced to the inter-message gap $g_1$ associated with terminal $TL_1$. At the same time, the gap between termination of each message transmission by terminal $TL_3$ and the initiation of each message transmission by terminal $TL_4$ successively increases until it reaches a duration equal to the duration of the growth gap illustrated in FIG. 3. As a result, the periodicity of each cycle of operation of the data communication system will be determined by that one of the terminals $TL_1$–$TL_4$ having the slowest transmission interval timer 30.

To further illustrate the operation of the data communication system of the present invention, reference will now be made to the construction and operation of a simplified version of each transmitting terminal $TL_1$–$TL_4$.

Figure 5:
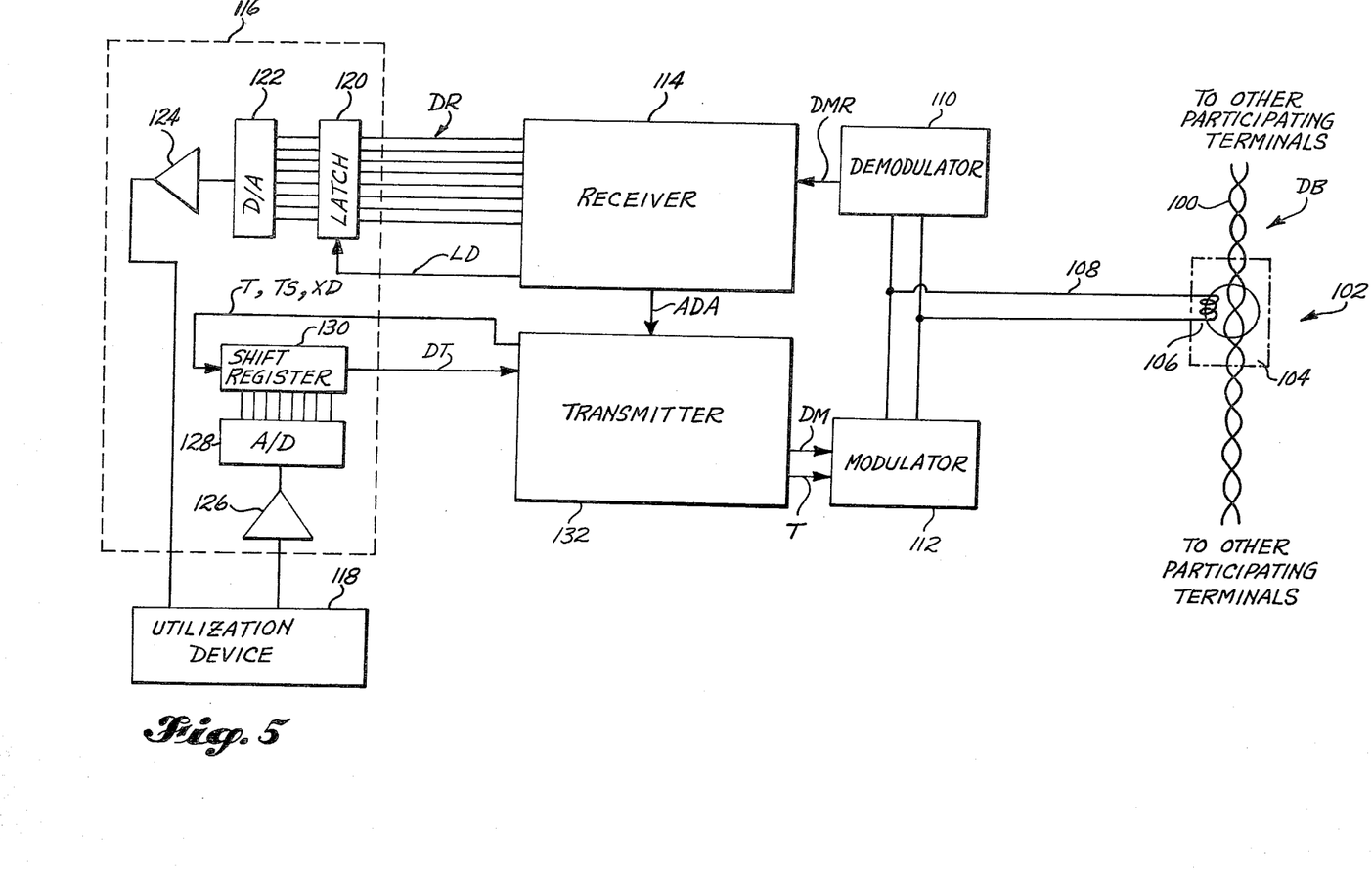
FIG. 5 is a block diagram of a simplified version of a participating terminal, and of an associated utilization device and interface unit.

In FIG. 5, the data bus DB comprises a twisted pair of wires 100 extending to all terminals, with the terminations (not illustrated) of the twisted pair of wires 100 being short-circuited so that the data bus DB comprises a single, continuous current loop. Messages on the data bus DB are in the form of currents, and are coupled to and from each transmitting terminal by an associated bus coupler 102 which includes a core 104 whose legs are inserted into two adjacent loops formed by the twisted pair of wires 100 so that each wire thereof constitutes a single turn of a primary winding of the bus coupler 102. A secondary winding 106 is also wound around the core 104 and is interconnected with the transmitting terminal by a terminal stub 108 comprising a twisted pair of wires. Preferably, the data bus DB and the bus coupler 102 are those disclosed and claimed in my copending application entitled "Current Mode Data or Power Bus," filed concurrently herewith, and reference should be made to that application for further details thereof.

Within the terminal, the terminal stub 108 is connected in common to the input of a demodulator 110 and to the output of a modulator 112. The output from demodulator 110 comprises a signal DMR which represents the demodulated message and which is applied to the input of a receiver 114 whose construction and operation will be described hereinafter with reference to FIG. 6. The outputs from receiver 114 comprise a signal ADA, which is produced upon the absence of messages upon the data bus DB, and a plurality of parallel, binary output signals DR, which represent the data within any message on the data bus DB and received by the receiver 114. An interface unit 116 is provided for controlling the interchange of data between the terminal and its associated utilization device 118. Included in the interface unit 116 is a latch circuit 120 to which is applied the parallel, binary output signals DR from receiver 114 and which is operative to store the received data represented by such signals DR under control of signal LD from receiver 114 as described hereinafter. The received data in latch 120 is converted into an analog signal by a D/A converter 122, amplified by an amplifier 124, and supplied to the utilization device 118.

The utilization device 118 provides an analog output signal, representing the data to be transmitted, to interface unit 116. Within interface unit 116, the analog output signal from utilization device 118 is amplified by an amplifier 126, converted into a parallel, digital format by an A/D converter 128, and stored in a shift register 130. Under control of signals T, TS and XD from a transmitter 132 within the terminal, as described hereinafter, the transmitted data within shift register 130 is transferred as a signal DT, in serial, digital form, to transmitter 132. At periodic transmission intervals in accordance with the above-described protocol, and in response to the signal ADA from receiver 114, transmitter 132 provides an output signal DM, in serial digital form, representing the transmitted data, the label or address of the terminal, and synchronizing and parity information. The signals DM and T from the transmitter 132 are applied to modulator 112 whose output has three distinct states. During the time that the signal T is absent, the output of modulator 112 has a high impedance so as to decouple the modulator 112 from the data bus DB. During the time that the signal T is present, signifying the transmission of a message from the terminal, the output of modulator 112 has present thereon an output signal which alternates between first and second levels in response to the signal DM, with the first and second levels being respectively positive and negative. The output signal from modulator 112 is applied directly to the input of demodulator 110, and via terminal stub 108 and bus coupler 102 to the data bus DB.

Figure 8:
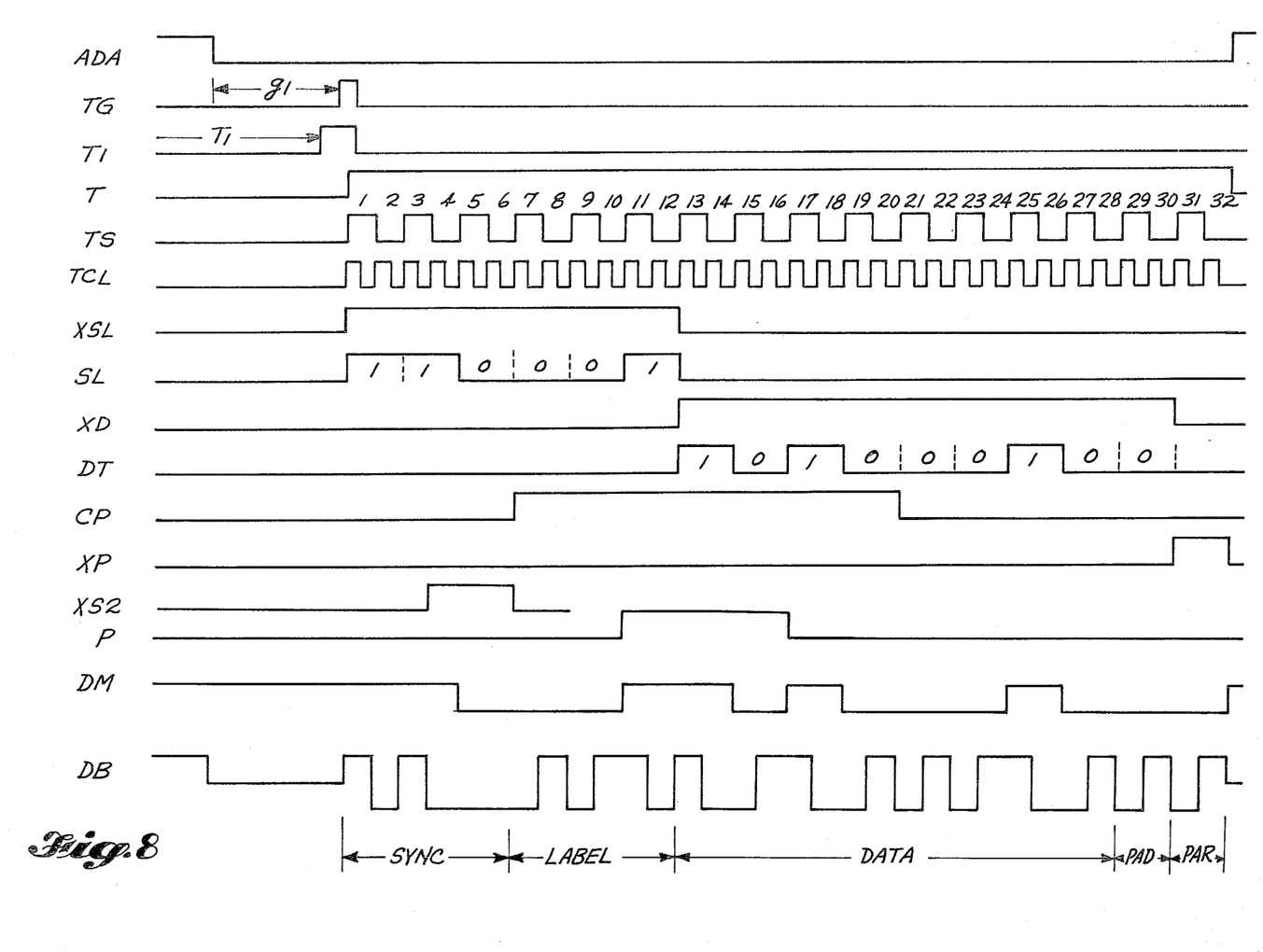
FIG. 8 is a timing diagram illustrating the operation of the transmitter and modulator in FIG. 7.

With reference now to FIG. 8, only one message is transmitted by each terminal during its transmission interval. As a particular example, each message comprises a serial digital word having, in sequential order, a three-bit SYNC word, a three-bit LABEL word, an eight-bit DATA word, a PAD bit, and a PARITY bit. The format of each message transmitted is Manchester bi-phase level modulation, wherein successive positive and negative levels in the output signal from modulator 112 represent a "1" and successive negative and positive levels in the output signal from modulator 112 represent a "0".

Figure 6:
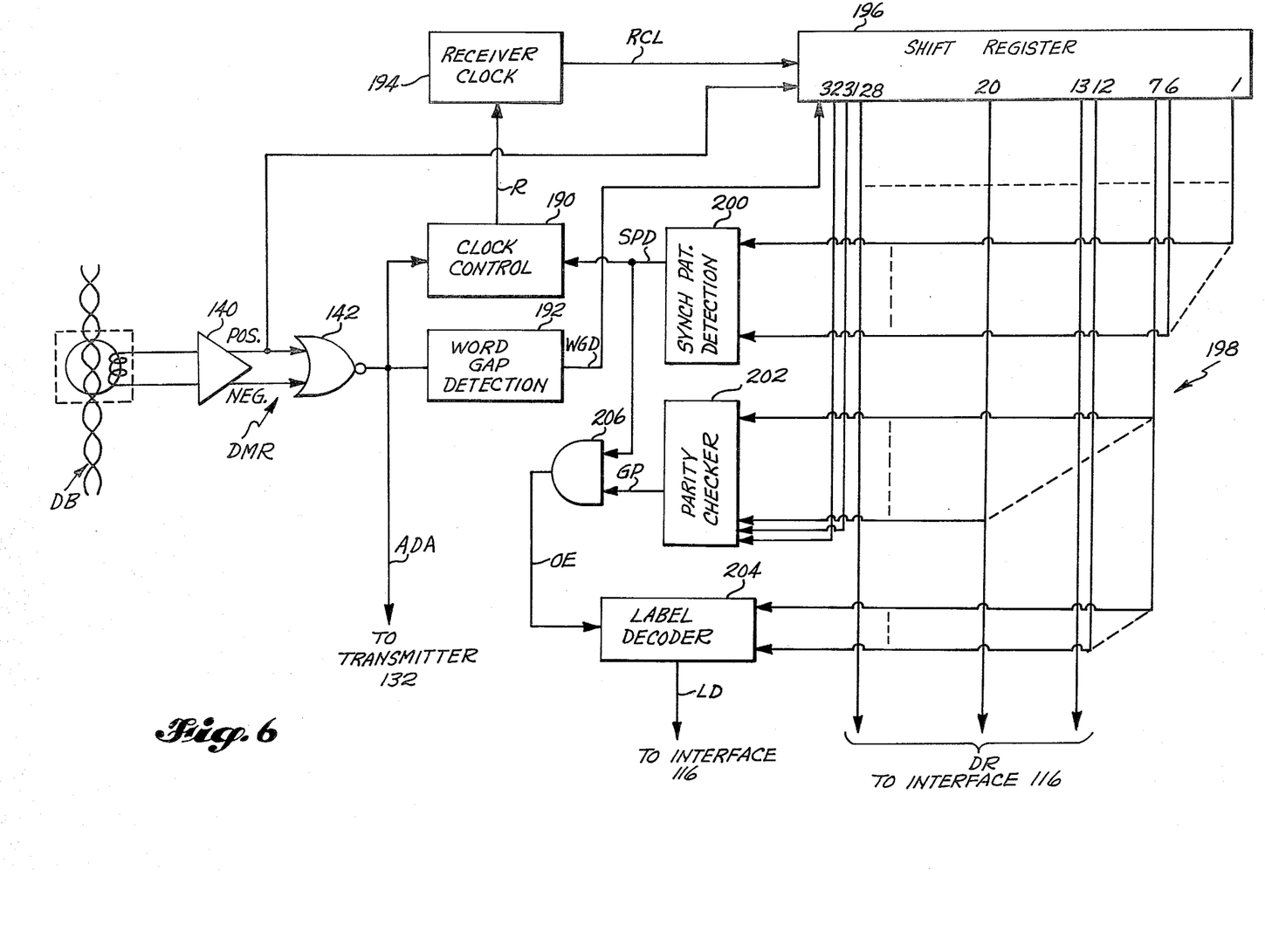
FIG. 6 is a block diagram of a demodulator and a receiver in FIG. 5.

With reference now to FIG. 6, the demodulator 110 includes an amplifier 140 which provides a POS output for the duration of each positive level of the signal on data bus DB, and which provides an NEG output for the duration of each negative level of the signal on the data bus DB. At all other times, sense amplifier 140 provides no output. The POS and NEG outputs of sense amplifier 140 are applied to respective inputs of an OR gate 142 whose output comprises the signal ADA. As illustrated in FIG. 8, when either the POS or NEG outputs are being provided by sense amplifier 140, the signal ADA is at a high logic level, signifying the presence of a message on the data bus DB. When neither the POS nor the NEG outputs from sense amplifier 140 are present, the signal ADA switches to a low logic level, signifying the absence of any message on the data bus DB.

Figure 7:
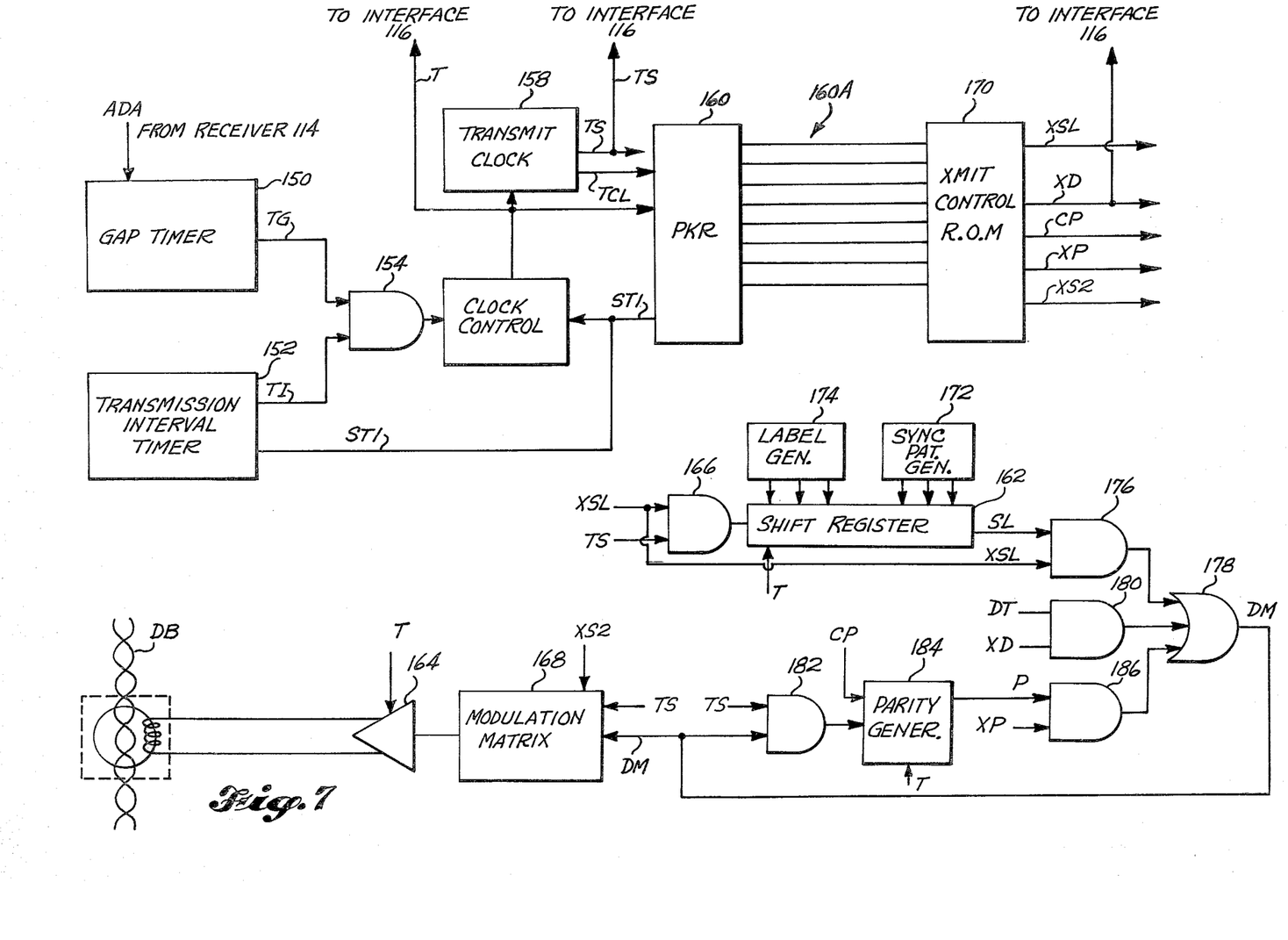
FIG. 7 is a block diagram of a transmitter and a modulator in FIG. 5.

Let it be assumed that the terminal under discussion is terminal $TL_1$ (FIG. 1), with inter-message gap $g_1$ and transmission interval $T_1$. With reference to FIG. 7, the signal ADA is applied to a gap timer 150 within transmitter 132. Gap timer 150 may comprise a monostable multivibrator which is adapted to provide a momentary output signal TG at a predetermined time after each high level-low level transition in the signal ADA, with the predetermined time corresponding to the desired inter-message gap $g_1$. Transmitter 132 also includes a transmission interval timer 152, which also may comprise a monostable multivibrator, and which is adapted to provide a momentary output signal T1 at a predetermined time after the application of a signal ST1 thereto. As will be described hereinafter, signal ST1 is provided at the end of a message transmission from the terminal, and the predetermined time of transmission interval timer 152 is chosen so that the signal T1 is provided at a time corresponding to the desired transmission interval $T_1$ for the terminal. Signals TG and T1 are applied to respective inputs of an AND gate 154 whose output is connected to the input of a clock control circuit 156, which may comprise a resettable RS flip-flop. With reference to FIG. 8, let it be assumed that message transmission on the data bus DB has terminated. Accordingly, the signal ADA goes to a low logic level. At a time $g_1$ thereafter, and at the elapse of the transmission interval $T_1$, signified by the signals TG and T1, respectively, AND gate 154 provides an output signal which sets clock control circuit 156 into a first state thereof, wherein an output signal T thereof goes to a high logic level to initiate a message transmission from the terminal. The signal T is applied to a transmit clock 158, a program counter 160, a shift register 162, a line driver 164, and a parity generator 184 in transmitter 132, as well as to the shift register 130 in interface unit 116, to control the operation of those components as described hereinafter.

When the signal T goes to a high logic level, transmit clock 158 is enabled to produce clock signals TS and TCL (FIG. 8), with the frequency of the signal TCL being twice that of the signal TS. The clock signal TCL is applied to the program counter 160. The clock signal TS is applied to a modulation matrix circuit 168, an AND gate 166, and an AND gate 182 in transmitter 132, as well as to the shift register 130 in interface unit 116.

The program counter 160, which may comprise a fixed-length, binary counter, provides a plurality of binary output signals 160A to a transmit control ROM 170 which is appropriately programmed to respond to the binary output signals 160A to provide signals XSL, XD, CP, XP and XS2 which have a high logic level during a desired transmission of the SYNC word and LABEL word, a desired transmission of the DATA, a desired parity check, a desired transmission of the PARITY bit, and a desired modification of the SYNC word, respectively. More specifically (FIG. 8), XSL goes to a high logic level at the time signal T goes to a high logic level, and goes to a low logic level upon the initiation of the thirteenth pulse in the clock signal TCL. XD goes to a high logic level upon the initiation of the thirteenth pulse in clock signal TCL, and goes to a low logic level at the initiation of the thirty-first pulse in the clock signal TCL. CP goes to a high logic level at the initiation of the seventh pulse in the clock signal TCL, and goes to a low logic level at the initiation of the twenty-first pulse in the clock signal TCL. XP goes to a high logic level at the initiation of the thirty-first pulse in the clock signal TCL, and goes to a low logic level at the time the signal T goes to a low logic level. Finally, XS2 goes to a high logic level at the initiation of the fourth pulse in the clock signal TCL, and goes to a low logic level at the initiation of the seventh pulse in the clock signal TCL.

The three-bit SYNC word and the three-bit LABEL word are stored, respectively, in a SYNC pattern generator 172 and a LABEL generator 174 whose outputs are coupled to respective inputs of shift register 162. When the signal T goes to a high logic level at the beginning of the message transmission, the SYNC word and the LABEL word are transferred into shift register 162. Since the signal XSL is at a high logic level at this time, AND gate 166 applies the clock signal TS to the clock input of shift register 162 so that the SYNC word and LABEL word are strobed out of shift register 162 to form the signal SL. In the example under discussion, the SYNC word is represented by binary "110" and the LABEL word, for terminal TL1, is represented by binary "001". The signals SL and XSL are applied to respective inputs of an AND gate 176, whereby the signal SL is gated to a first input of an OR gate 178. The output signal from OR gate 178 comprises the signal DM which is applied to the modulator 112, and, more specifically, to the modulation matrix circuit 168 therein. Therefore, from the initiation of message transmission to the time that the signal XSL goes to a low logic level, the signal DM comprises the signal SL, as illustrated in FIG. 8.

Although the SYNC word will remain the same for all participating terminals in the data communication system, the LABEL word will of course vary from terminal to terminal. It will also be recognized that the LABEL can identify not only a specific terminal, but also a specific message from that terminal, in which case the LABEL may comprise part of the data to be transmitted by the terminal.

When the signal XSL goes to a low logic level, the signal XD goes to a high logic level. When signal XD goes to a high logic level, shift register 130 is enabled, and the contents thereof are strobed by the signal TS to form the output signal DT. In the example under consideration, the transmitted data is represented by binary "10100010" plus a binary "0" PAD bit which is provided for expansion of such transmitted data. The signals XD and DT are applied to respective inputs of an AND gate 180 whose output is coupled to a second input of OR gate 168. Accordingly, the signal DM comprises the signal DT, for the duration of the signal XD, as illustrated in FIG. 8.

To generate the PARITY bit, the signals DM and TS are applied to respective inputs of an AND gate 182 whose output is coupled to the input of parity generator 184. The output of parity generator 184 is a signal P, representing the PARITY bit, and is applied along with the signal XP to respective inputs of an AND gate 186 whose output is coupled to a third input of OR gate 178. Parity generator 184 is also provided with the signals T and CP, and may comprise a J-K flip-flop. When the signal T goes to a high logic level at the initiation of message transmission, parity generator 184 is set to a state whereupon the output signal P thereof is at a low logic level. During the time that the signal CP is at a high logic level, parity generator 184 is enabled and is responsive to low-high level transitions in the signal DM, as strobed through AND gate 182 by clock signal TS, to toggle its output signal P between low and high logic levels. In the example under consideration, the signal P goes to a high logic level upon the first low-high logic level transition in the signal DM, and then goes to a low logic level at the next low-high logic level transition in the signal DM. When the signal CP returns to a low logic level, the signal P remains at a low logic level and is gated through AND gate 186 at the time that the signal XP goes to a high logic level. Accordingly, the signal DM comprises the signal P, for the duration of the signal XP, as illustrated in FIG. 8.

The signal DM is applied to the modulation matrix circuit 168 which responds to the clock signal TS to develop a Manchester bi-phase level modulated output signal DB therefrom.

The operation of modulation matrix circuit 168 is largely conventional. However, the last bit of the SYNC word is "zero", which would normally result in a low-high logic level transition in the output signal DB. To insure the proper operation of the receivers in the participating terminals of the data communication system, the signal XS2 causes the modulation matrix circuit 168 to maintain the output signal DB at a low logic level during the time occurrence of the third bit in the SYNC word, as best seen in FIG. 8.

The output signal from modulation matrix circuit 168 is applied to the input of the line driver 164. During the time that the signal T from clock control circuit 156 is at a low logic level, the output from line driver 164 is at a high impedance. When the signal T switches to a high level, line driver 164 converts each high logic level of the output signal from modulation matrix circuit 168 into a corresponding positive level, and each low logic level of the output signal from modulation matrix circuit 168 into a corresponding negative level.

At the time that the count in program counter 160 has advanced to its maximum value, program counter 160 provides signal ST1 which resets clock control circuit 156 into a second state. As a result, the signal T goes to a low logic level to terminate the message transmission by resetting program counter 160, clearing shift register 162, clearing shift register 130 in interface unit 116, and returning line driver 164 to a high impedance state. Simultaneously, signal ST1 re-initiates the timing period of transmission interval timer 152. The transmission interval T1 from the terminal TL$_1$ is accordingly determined by the duration of the message transmission for the terminal, which is of fixed duration, plus the time period established by transmission interval timer 152. Accordingly, even though the gap timer 150 will subsequently provide one or more signals TG, a subsequent message transmission from terminal TL$_1$, cannot occur until the elapse of the transmission interval T$_1$ as determined by the signal T1 from transmission interval timer 152.

With reference back to FIG. 6, the signal ADA in the receiver 114 is applied to the input of a clock control circuit 190 and to the input of a word gap detection circuit 192. The clock control circuit 190 may comprise an R/S flip-flop, and the word gap detection circuit 192 may comprise a monostable multivibrator. When the signal ADA goes to a low logic level, signifying the presence of a message on the data bus, the clock control circuit 190 is set to a first state in which an output signal R therefrom has a high logic level. The signal R is applied to a receiver clock 194 which is operative to provide a clock signal RCL whenever the signal R has a high logic level. A shift register 196 is provided for storing messages, as coupled thereto by the POS output of sense amplifier 140 and under control of the clock signal RCL. Therefore, when a message appears on the data bus DB, the signal R goes to a high level, the clock signal RCL is produced, and the message is sequentially transferred into the shift register 196.

The shift register 196 has a plurality of outputs (outputs "1"–"32" in the example under consideration) which are interconnected by means of a matrix circuit 198 with a sync pattern detection circuit 200, a parity checker circuit 202, and a label decoder 204. Specifically, outputs "1"–"6" of the shift register 196, representing the bit locations of the SYNC word, are coupled to respective inputs of sync pattern detection circuit 200. Outputs "7"–"20" of the shift register 196, representing the message bits used for generation of the PARITY bit, and outputs "31"–"32" of the shift register 196, representing the bit locations of the PARITY bit, are coupled to the respective inputs of parity checker circuit 202. Outputs "7"–"12" of the shift register 196, representing the bit locations of the LABEL word, are applied to respective inputs of the label decoder 204.

Sync pattern detection circuit 200 may comprise a decoder whose output signal SPD goes to a high logic level when the signals applied to its input represent the desired SYNC word. The signal SPD is applied to a second input of clock control circuit 190, and to an AND gate 206. The parity checker circuit 202 includes a decoder which is operative to provide a signal representing the binary state of the desired PARITY bit as developed from the message bits used to develop that PARITY bit, and a comparator which is operative to provide an output signal GP which has a high logic level when the value of the desired PARITY bit is equal to that of the actual PARITY bit. When the signals SPD and GP are at a high logic level, AND gate 206 provides an output signal OE which is applied to an ENABLE input of label decoder 204.

As the message on the data bus DB is transferred into the shift register 196, the presence of the proper SYNC word in the appropriate storage locations of shift register 196 causes the output signal SPD from sync pattern detection circuit 200 to go to a high logic level. When signal SPD goes to a high level, clock control circuit 190 is reset to a second state, whereupon signal R therefrom goes to a low level, thereby terminating the signal RCL from receiver clock 194 and accordingly terminating the transfer of the message into shift register 196.

Figures 9, 10A, 10B, 10C, 11A, 11B, 11C:
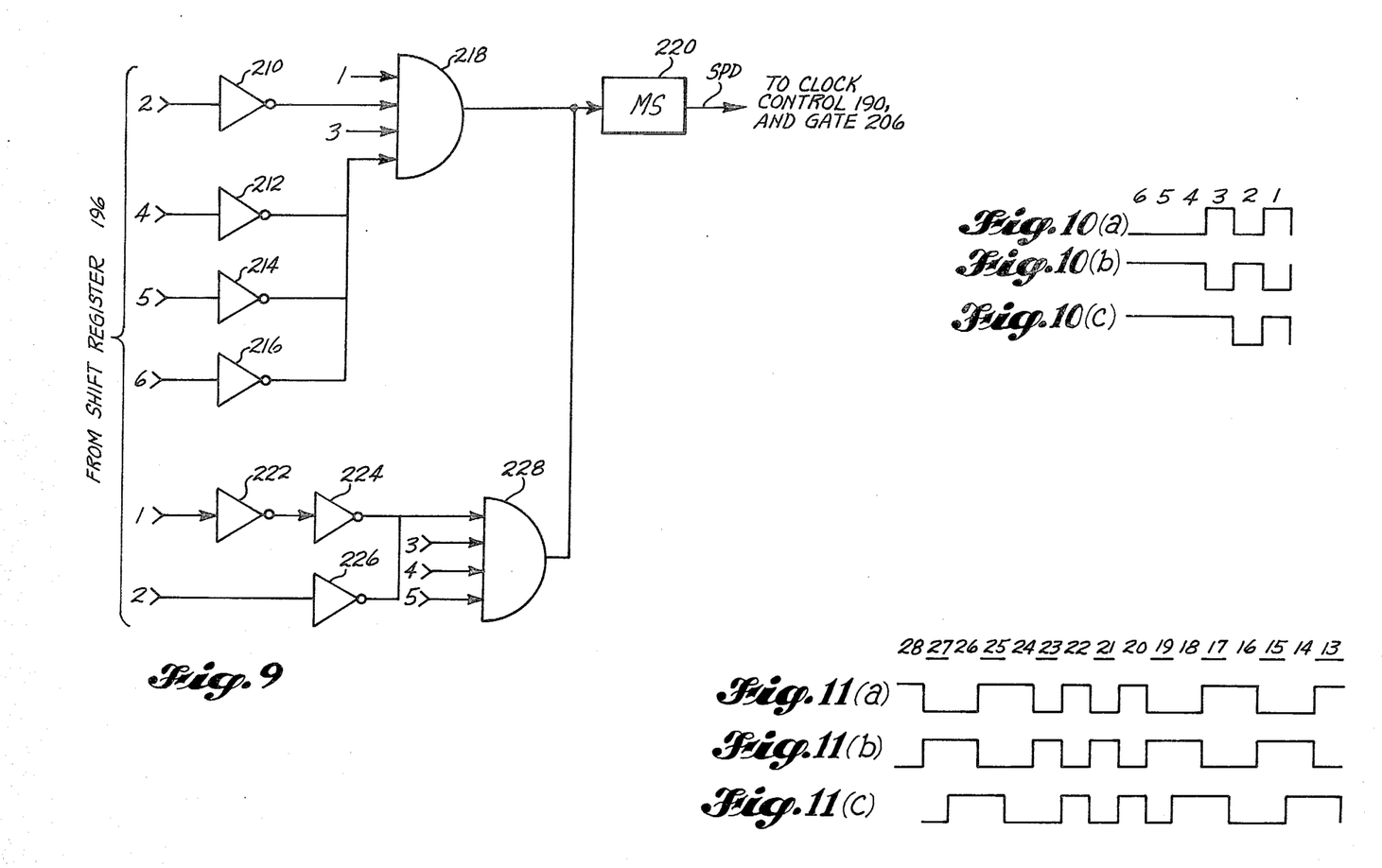
FIG. 9 is a block diagram of a sync pattern detection circuit in FIG. 6.

With reference now to FIGS. 9, 10 and 11, the sync pattern detection circuit 200 includes an AND gate 218 whose output is coupled to the input of a monostable multivibrator 220 which is capable of providing the output signal SPD. The "1" output of shift register 196 (as routed through matrix circuit 198) is coupled directly to a first input of AND gate 218; the "2" output of shift register 196 is coupled through an inverter 210 to a second input of AND gate 218; the "3" output of shift register 196 is coupled directly to a third input of AND gate 218; and, the "4", "5" and "6" outputs of shift register 196 are coupled through respective inverters 212, 214 and 216 to a fourth input of AND gate 218. As will be recalled from a review of FIG. 8, the SYNC word precedes the remainder of the message and is represented in the message by a positive bit level, a negative bit level, a positive bit level, and three negative bit levels, in succession. As the message on the data bus DB is transferred into the shift register 196, the SYNC word therefore has the pattern illustrated in FIG. 10(*a*). When this pattern reaches the last six bit locations in shift register 196 (to which outputs "1"–"6" are connected), the bits of the DATA word are in the proper bit locations in shift register 196 (e.g., those to which the outputs "13"–"28" are connected) and the AND gate 218 accordingly provides an output signal to cause monostable multivibrator 220 to provide the output signal SPD to terminate the transfer of the message into the shift register 196. Only the odd-numbered outputs in the group of outputs "13"–"28" of the shift register 196 are connected to the latch circuit 120 in the interface unit 116, as illustrated by the numeral underlining immediately above FIGS. 11(a), 11(b) and 11(c). Also, the PAD bit is discarded. The parallel, binary output signals DR (FIG. 6) presented to the latch circuit 120, which are those present on the odd-numbered outputs in the group of outputs "13"–"28" of shift register 196 (FIG. 11(a)), therefore represent "10100010", or, the data that has been transmitted.

Let it be assumed that the polarity of the message has been inverted from that originally transmitted (such as might occur due to a polarity reversal in the bus coupler 102) so that the message being transferred into shift register 196 is the logical complement of that originally transmitted. In this situation, the SYNC word will have a pattern as illustrated in FIG. 10(b) which will not result in AND gate 218 providing an output signal. To provide decoding of the SYNC word during conditions of polarity reversal, the sync pattern detection circuit 200 includes a second AND gate 228 whose output is coupled to the input of monostable multivibrator 220. The "1" output of shift register 196 is coupled through series inverters 222, 224, and the "2" output of shift register 196 is coupled through an inverter 226, to a first input of AND gate 228. The "3", "4" and "5" outputs of shift register 196 are coupled directly to respective second, third and fourth inputs of AND gate 228. When the polarity of the message is the inverse of that originally transmitted, the presence of the SYNC word having a pattern as illustrated in FIG. 10(b) will not result in the AND gate 218 providing an output signal, as previously described, and the DATA word will appear as illustrated in FIG. 11(b). Accordingly, the receiver clock 194 (FIG. 6) remains enabled and the clock signal RCL therefrom continues to transfer the message into and through the shift register 196. When the message has been transferred one additional bit location, the pattern of the SYNC word, as illustrated in FIG. 10(c), causes AND gate 228 to provide an output signal to cause monostable multivibrator 220 to provide the output signal SPD to terminate the message transfer. At this time, the DATA word will appear as illustrated in FIG. 11(c), so that the signals DR present on the odd-numbered outputs in the group of outputs "13"–"28" represent "10100010", or, the data that has been transmitted.

Accordingly, the embodiment of the sync pattern detection circuit 200 in FIG. 9 allows proper decoding of the transmitted data, irrespective of the polarity with which the message has been provided to the receiver 114. It also should be noted that the pattern of the SYNC word in the message is an improper code for Manchester bi-phase level modulation, that is, the pattern of the SYNC word includes three successive logic levels of a given type, whereas a proper Manchester bi-phase level code permits only two successive logic levels of the same type. Accordingly, messages not having the pattern of the SYNC word do not cause the sync pattern detection circuit 200 to provide its output signal SPD, with the result that such messages are transferred through shift register 196 without decoding.

Referring again to FIG. 6, if the binary value of the desired PARITY bit compares with that of the actual PARITY bit, then the signal GP from parity checker circuit 202 will be at a high logic level, so that the signal OE from AND gate 206 is provided to enable label decoder 204. An output signal LD is provided by label decoder, however, only if the LABEL word in the message identifies data which the terminal is to receive. The signal LD is applied to an enable input of latch circuit 120 in interface unit 116 (FIG. 5). As previously described, the outputs "13"–"28" of shift register 196, on which appear the parallel, binary output signals DR representing the DATA word, are connected to respective signal inputs of latch circuit 120. If the LABEL word in the message is correct, the signal LD enables latch circuit 120 so as to transfer the signals DR thereto.

When the signal ADA again goes to a high logic level, signifying the absence of a message on the data bus DB, the word gap detection circuit 192 is enabled. At a predetermined time thereafter, word gap detection circuit 192 provides a signal WGD which clears shift register 196, thereby conditioning the terminal for the reception of a successive message.

It will therefore be appreciated that the present invention permits each participating terminal to have autonomous access to the data bus DB. For example, the receiver in any one terminal is capable of detecting and storing any messages transmitted on the data bus DB, and to transfer the data within any such message to its associated utilization device upon proper message identification, irrespective of the operation of any other terminal. Likewise, the transmitter in any one terminal can transmit a message on the data bus DB in response only to the absence of messages on the data bus DB, and thus irrespective of the transmission by any other terminal. By the use of the protocol previously described, the invention permits periodic transmission of messages by each terminal without the requirement for a central bus controller terminal, and yet avoids the simultaneous transmission of messages by two or more terminals. Further, failure of any terminal or terminals will not constitute failure of any other terminal. For example, the failure of a receiver in any one terminal will not affect the operation of the receiver or transmitter in any other terminal. Likewise, the failure of the transmitters in all terminals, except one, to transmit messages will not result in the transmitter in that one terminal failing to periodically transmit its message, inasmuch as message transmission from that one terminal is dependent only upon the expiration of the unique inter-message gap (which in this case will be measured from the termination of the message transmission of that one terminal) and the elapse of the transmission interval for that one terminal.

Finally, the failure of a demodulator, receiver, transmitter or modulator in any one terminal will not result in failure of the data bus DB, provided that a data bus, and associated couplers, such as disclosed and claimed in my previously referred to copending application are used. For example, a short circuit across the secondary winding 106 of the bus coupler 102, or a broken core 104, will reduce the inductance of the bus coupler 102 so as to have the same effect upon the operation of the data bus DB as would be caused by removal of the bus coupler 102. Likewise, an open secondary winding 106, or a severed terminal stub 108, will result in an increase in the inductance presented by the bus coupler 102 to the data bus DB, since the secondary winding 106 is no longer in parallel with the demodulator 110 and modulator 112. By considering this increased inductance as the maximum terminal design load, and accordingly designing the data bus DB therefor, it can be seen that such failure will have no effect upon the operation of the data bus DB.

While the invention has been described with reference to a preferred embodiment, it is to be clearly understood by those skilled in the art that the invention is not limited thereto. Rather, the scope of the invention is to be interpreted only in conjunction with the appended claims.

The embodiments of the invention in which an exclusive property or privilege is claimed are defined as follows:

1. A method which permits each of a plurality of terminals to autonomously transmit messages on a data communication medium asynchronously with respect to any other of said plurality of terminals, said method comprising the steps, at each said terminal, of:
   detecting the absence of messages on said data communication medium; and
   enabling transmission of a message by said terminal only upon the occurrence of an absence of messages on said data communication medium whose duration substantially equals that of an inter-message gap unique to said terminal, and, the elapse of a transmission interval from a previous transmission of a message by said terminal, said transmission interval having a predetermined duration which is substantially the same for each said terminal.

2. A method as recited in claim 1, wherein the duration of said transmission interval is chosen to be greater than the sum of all said inter-message gaps and of the durations of all messages transmitted by said plurality of terminals since a previous transmission of a message by said terminal.

3. A method as recited in claim 1, wherein the messages transmitted by each said terminal have a fixed duration.

4. A method as recited in claim 3, wherein the messages transmitted by said plurality of terminals have equal durations.

5. A method as recited in claim 3, wherein the messages transmitted by said plurality of terminals have unequal durations.

6. A method as recited in claim 1, wherein each said message consists of a plurality of message words separated in time by an inter-word gap, and wherein each said inter-message gap is greater than said inter-word gap.

7. A method as recited in claim 1, wherein each said message is in the form of at least one serial, digital data word transmitted on said data communication medium.

8. A method as recited in claim 7, wherein said data communication medium is a data bus.

9. A data communication system comprising: a data communication medium; and, a plurality of terminals coupled to said data communication medium, each said terminal including: first means for providing a first output signal in response to an absence of messages on said data communication medium whose duration substantially equals that of an inter-message gap unique to said terminal; second means for providing a second output signal at periodic transmission intervals, each of which is initiated at a previous message transmission by said terminal and which has a predetermined duration which is substantially the same for each said terminal; third means for transmitting a message on said data communication medium asynchronously with respect to any other of said plurality of terminals; and. fourth means for enabling said third means in response to said first and said second output signals.

10. A data communication system as recited in claim 9, wherein each said terminal also includes fifth means for receiving messages transmitted on said data communication medium.

11. A data communication system as recited in claim 10, wherein each said terminal is adapted to exchange information with an asociated utilization device, and wherein each said terminal further includes interface means for transferring messages received by said fifth means to the utilization device, and for transferring messages to be transmitted from the utilization device to said third means.

12. A data communication system as recited in claim 11, wherein said third means is operative to include a label of terminal origin in each message transmitted thereby, and wherein said interface means is operative to transfer messages received by said fifth means to the utilization device only if said received messages include a predetermined label.

13. A data communication system as recited in claims 9 or 10, further comprising at least one other terminal coupled to said data communication medium, said at least one other terminal including means for receiving messages transmitted on said data communication medium.

14. A data communication system as recited in claims 9 or 10, wherein said third means is operative to transmit said messages in the form of serial, digital data words.

15. A data communication system as recited in claims 9 or 10, wherein said data communication medium comprises a data bus.

16. A terminal which is capable of autonomous access, along with other terminals, to a data bus, for the purpose of transmitting and receiving messages, in the form of serial, digital words representing data and a label of terminal origin for said data, on the data bus, said transmission by said terminal being asynchronous with respect to said other terminals, and which is further capable of exchanging data with an associated utilization device, said terminal comprising:

(a) a receiver adapted to be coupled to the data bus for temporarily storing said serial, digital words, and for transferring the data within each said serial, digital word to an associated utilization device upon detection of a predetermined label of terminal origin therein;

(b) a transmitter adapted to be coupled to the data bus for receiving data to be transmitted from the associated utilization device, and for transmitting, when enabled, at least one serial, digital word including said data to be transmitted and a label of terminal origin;

(c) a data word detector coupled to said receiver for providing a first output signal during the absence of messages on the data bus;

(d) a gap timer adapted to time said first output signal and to provide a second output signal when said first output signal has a predetermined duration substantially equal to an inter-message gap which is unique to said terminal;

(e) a resettable transmission interval timer which is operative to provide a third output signal at the elapse of a predetermined period of time following reset of said transmission interval timer, said predetermined period of time being related to a transmission interval having a duration which is substantially the same for each terminal accessing the data bus, including said terminal; and, (f) control means responsive to said second and third output signals for enabling said transmitter, and for resetting said transmission interval timer.

17. A terminal as recited in claim 16, wherein said receiver includes: a storage means for storing said serial, digital words; and, a label decoder coupled to said storage means for enabling the transfer of said data in said storage means to the associated utilization device when the label in said storage means is identical to said predetermined label.

18. A terminal as recited in claims 15 or 16, wherein said transmitter includes: a source of said label of terminal origin; a modulator for converting said data to be transmitted and said label into the form of said serial, digital word; and, gating means enabled by said control means for sequentially coupling said source of said predetermined label and the associated utilization device to said modulator.

19. A terminal as recited in claim 16, wherein said terminal is particularly adapted for use with a data bus comprising an elongated, twisted pair of conductors having short-circuit terminations, and further comprising means for inductively coupling said receiver and said transmitter to the twisted pair of conductors.

20. A terminal as recited in claim 16, wherein said transmitter is adapted to transmit, when enabled, a message fixed duration; and, wherein said control means includes means responsive to termination of each said message for resetting said transmission interval timer.

21. A terminal as recited in claim 16, wherein said transmitter is adapted to transmit, when enabled, at least one serial, digital word including a plurality of successive bits which have a predetermined modulation and which represent a predetermined order of said data to be transmitted, said label, and a sync word; wherein the bits of said sync word have a predetermined pattern which is improper for said predetermined modulation; and, wherein said receiver includes: storage means having a plurality of successive bit locations; first means for transferring the successive bits of said serial, digital word into said storage means and successively through said plurality of successive bit locations thereof; and, second means responsive to the bits within a first group of said plurality of successive bit locations for disabling said first means upon detection of said pattern of said sync word.

22. A terminal as recited in claim 21, wherein said predetermined modulation is Manchester bi-phase level modulation; wherein said receiver is particularly adapted to transfer said data in parallel form to its associated utilization device, notwithstanding that each said serial, digital word as received is in the form as originally transmitted, or in the form of a logical complement thereof, said receiver further including means for coupling every other bit location in a second group of said plurality of successive bit locations to said utilization device; and, wherein said second means further includes means for disabling said first means either upon detection of said pattern of said sync word, or, upon detection of the logical complement of said pattern of said sync word when said successive bits of said serial, digital word have each been successively transferred one additional bit location in said storage means.

* * * * *

UNITED STATES PATENT AND TRADEMARK OFFICE
CERTIFICATE OF CORRECTION

PATENT NO. : 4,199,663

DATED : April 22, 1980

INVENTOR(S) : Hans K. Herzog

It is certified that error appears in the above—identified patent and that said Letters Patent are hereby corrected as shown below:

Column 6, line 29: delete "theeby" and insert --thereby--;
Column 6, line 39: delete "provdes" and insert --provides--.
Column 17, line 9: delete "and." and insert --and,--.
Column 18, line 40: delete "message fixed" and insert --message of fixed--.

Signed and Sealed this

Fifth Day of August 1980

[SEAL]

Attest:

SIDNEY A. DIAMOND

*Attesting Officer*  *Commissioner of Patents and Trademarks*